US010584024B2

(12) United States Patent
Fieglein et al.

(10) Patent No.: US 10,584,024 B2
(45) Date of Patent: Mar. 10, 2020

(54) FUEL DISPENSER COMMUNICATION

(71) Applicant: Wayne Fueling Systems LLC, Austin, TX (US)

(72) Inventors: Henry Fieglein, Cedar Park, TX (US); Richard Carlsson, Malmo (SE)

(73) Assignee: Wayne Fueling Systems LLC, Austin, TX (US)

(*) Notice: Subject to any disclaimer, the term of this patent is extended or adjusted under 35 U.S.C. 154(b) by 0 days.

(21) Appl. No.: 16/275,999

(22) Filed: Feb. 14, 2019

(65) Prior Publication Data
US 2019/0177152 A1 Jun. 13, 2019

Related U.S. Application Data

(62) Division of application No. 15/206,951, filed on Jul. 11, 2016, now Pat. No. 10,214,411.

(51) Int. Cl.
*B67D 7/62* (2010.01)
*B67D 7/08* (2010.01)
(Continued)

(52) U.S. Cl.
CPC .............. *B67D 7/62* (2013.01); *B67D 7/04* (2013.01); *B67D 7/08* (2013.01); *B67D 7/307* (2013.01);
(Continued)

(58) Field of Classification Search
CPC . A67D 7/62; A67D 7/307; A67D 7/04; A67D 7/08; A67D 7/14; G06Q 20/20; G05B 2219/45076; B67D 2007/044
USPC ........ 222/1, 2, 200, 23, 25–27, 52; 700/231, 700/232; 364/479.01, 479.02, 479.06, 364/479.11
See application file for complete search history.

(56) References Cited

U.S. PATENT DOCUMENTS 5,557,529 A 9/1996 Warn et al.
5,663,887 A * 9/1997 Warn ................... G06Q 20/202
700/232
(Continued)

FOREIGN PATENT DOCUMENTS

WO WO-2014085399 A2 6/2014

OTHER PUBLICATIONS

International Search Report and Written Opinion for Application No. PCT/US2017/041312 dated Sep. 13, 2017.
(Continued)

*Primary Examiner* — Lien M Ngo
(74) *Attorney, Agent, or Firm* — Mintz Levin Cohn Ferris Glovsky and Popeo, P.C.

(57) ABSTRACT

Various systems, devices, and methods are provided for facilitating communication between a forecourt controller and a fuel dispenser. In certain aspects, a fuel controller translator is provided for translating commands transmitted between the forecourt controller and the fuel dispenser. For example, where the forecourt controller transmits commands that are compatible with the payment terminal, but not with the fuel controller, the fuel controller translator can translate the commands received from the forecourt controller into a format compatible with the fuel controller. Conversely, the fuel controller translator can translate commands received from the fuel controller into a format that is compatible with the forecourt controller.

6 Claims, 4 Drawing Sheets

(51) Int. Cl.
  *B67D 7/04* (2010.01)
  *B67D 7/30* (2010.01)
  *G06Q 20/20* (2012.01)
  *B67D 7/14* (2010.01)

(52) U.S. Cl.
  CPC .............. *G06Q 20/20* (2013.01); *B67D 7/14* (2013.01); *B67D 2007/044* (2013.01); *G05B 2219/45076* (2013.01)

(56) References Cited

U.S. PATENT DOCUMENTS

| | | |
|---|---|---|
| 5,694,326 A | 12/1997 | Warn et al. |
| 5,790,410 A * | 8/1998 | Warn .................... G06Q 20/363 |
| | | 235/381 |
| 5,831,861 A * | 11/1998 | Warn ...................... B67D 7/04 |
| | | 700/231 |
| 6,116,505 A | 9/2000 | Withrow |
| 6,360,138 B1 | 3/2002 | Coppola et al. |
| 6,546,314 B1 | 4/2003 | Carr et al. |
| 7,280,087 B2 | 10/2007 | Williams et al. |
| 7,953,968 B2 * | 5/2011 | Robertson ............. G07F 7/1008 |
| | | 713/150 |
| 9,087,427 B2 | 7/2015 | Weston et al. |
| 10,214,411 B2 | 2/2019 | Fieglein et al. |
| 2001/0000614 A1 | 5/2001 | Royal et al. |
| 2006/0079993 A1 | 4/2006 | Warn et al. |
| 2006/0079995 A1 * | 4/2006 | Warn ...................... G07F 13/02 |
| | | 700/239 |
| 2015/0143116 A1 | 5/2015 | Tang et al. |
| 2015/0143123 A1 * | 5/2015 | Bergqvist ............. H04L 63/061 |
| | | 713/171 |
| 2017/0188180 A1 * | 6/2017 | Bretthauer .......... G07F 17/0014 |
| 2018/0009652 A1 | 1/2018 | Fieglein et al. |

OTHER PUBLICATIONS

U.S. Appl. No. 15/206,951, filed Jul. 11, 2016, U.S. Pat. No. 10,214,411, Henry Fieglein et al.

* cited by examiner

US 10,584,024 B2

FUEL DISPENSER COMMUNICATION

CROSS-REFERENCE TO RELATED APPLICATION

This application is a divisional of U.S. patent application Ser. No. 15/206,951 entitled "FUEL DISPENSER COMMUNICATION," filed Jul. 11, 2016, which is hereby incorporated herein by reference in its entirety.

FIELD

The present disclosure relates generally to fuel dispenser communication.

BACKGROUND

Various types of fuel dispensers are used for dispensing fuel to customers. Some form of remote dispenser controller is traditionally used for controlling the actual dispensing of fuel by the fuel dispensers. The dispenser controller is often on the same premises as the fuel dispensers and coupled to a store interface unit so that a site attendant can monitor and control particular fueling dispensers from a building at the site (e.g., a gas station or other store). The dispenser controller sends data signals to the fuel dispensers providing various information and commands thereto. The information traditionally includes price, preset amounts of fuel to dispense, and authorization to dispense fuel. The fuel dispensers likewise send data signals to the dispenser controller, traditionally including pump number, pump status, dispensed fuel volume, and sale value.

Communications to a fuel dispenser's fuel controller and payment terminal are traditionally based on which vendor is associated with the fuel controller and payment terminal since different vendors' fuel controllers and payment terminals require information and commands to be provided thereto in a particular format for proper functionality. During the course of a fuel dispenser's lifetime, the payment terminal may need to be replaced for any of a variety of reasons, such as to accommodate new methods of payment or to meet newly implemented security regulations. Traditionally, the new payment terminal must be associated with the same vendor as the vendor associated with the fuel controller. This is because store interface units traditionally recognize a single vendor for a single fuel dispenser and provide information and commands for the fuel dispenser to the dispenser controller in the format appropriate for that vendor. However, a new payment terminal meeting the needs of the fuel dispenser's owner may not be available from the same vendor as the fuel controller, thereby preventing the payment terminal from being replaced unless the entire fuel dispenser is replaced, which is an expensive and time-consuming process, or the payment terminal is replaced with a payment terminal that does not fully satisfy the fuel dispenser owner's needs but must be used to match the vendor of the fuel controller.

Accordingly, there remains a need for improved fuel dispenser communication.

SUMMARY

In general, fuel dispenser communication is provided.

In one aspect, a fuel controller translator can include a translator board connected by a first wire to an external source and connected by a second wire to a fuel controller in a fuel dispenser. The fuel controller translator is configured to receive a command from an external source, the command having a first format, translate the command into a second format compatible with the fuel controller, and transmit the translated command in the second format to the fuel controller.

In some variations one or more of the following features can optionally be included in any feasible combination.

The fuel controller translator can be configured to read a conversion table stored in a memory of the fuel controller translator, determine, based on the conversion table, the second format that corresponds to a type of fuel controller that will receive the translated command, and generate the translated command based on the determined second format.

The fuel controller translator can also be configured receive a second command in the second format from the fuel controller, translate the second command into a first format compatible with the external device, and transmit translated second command in the first format to the external device.

The fuel controller translator can yet be further configured to combine a plurality of commands in the first format into a single command in the second format, where the translated command is the single command.

The fuel controller translator can also be configured to expand a command in the first format into commands in the second format, where the translated command includes the commands in the second format.

The external source can be a point-of-sale system configured to control operation of a component of a fuel dispenser.

In an interrelated aspect, a fuel dispenser can include a housing. The housing can include a pump compartment with fuel dispensing components disposed therein, an electronics compartment, and a translator board. The pump compartment can have a fuel controller disposed within the pump compartment and configured to control dispensing of fuel by the fuel dispensing components. The electronics compartment can include a payment terminal configured to process payment for fuel dispensed by the fuel dispensing components. The translator board can be connected by a first wire to an external source and connected by a second wire to the fuel controller. The fuel dispenser can be configured to perform operations including, receive a command from an external source, where the command can have a first format, translate the command into a second format compatible with the fuel controller, and transmitting the translated command in the second format to the fuel controller.

Non-transitory computer program products (e.g., physically embodied computer program products) are provided that store instructions, which when executed by one or more data processors of one or more computing systems, causes at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

BRIEF DESCRIPTION OF DRAWINGS

This invention will be more fully understood from the following detailed description taken in conjunction with the accompanying drawings, in which.

DETAILED DESCRIPTION

Figure 1:
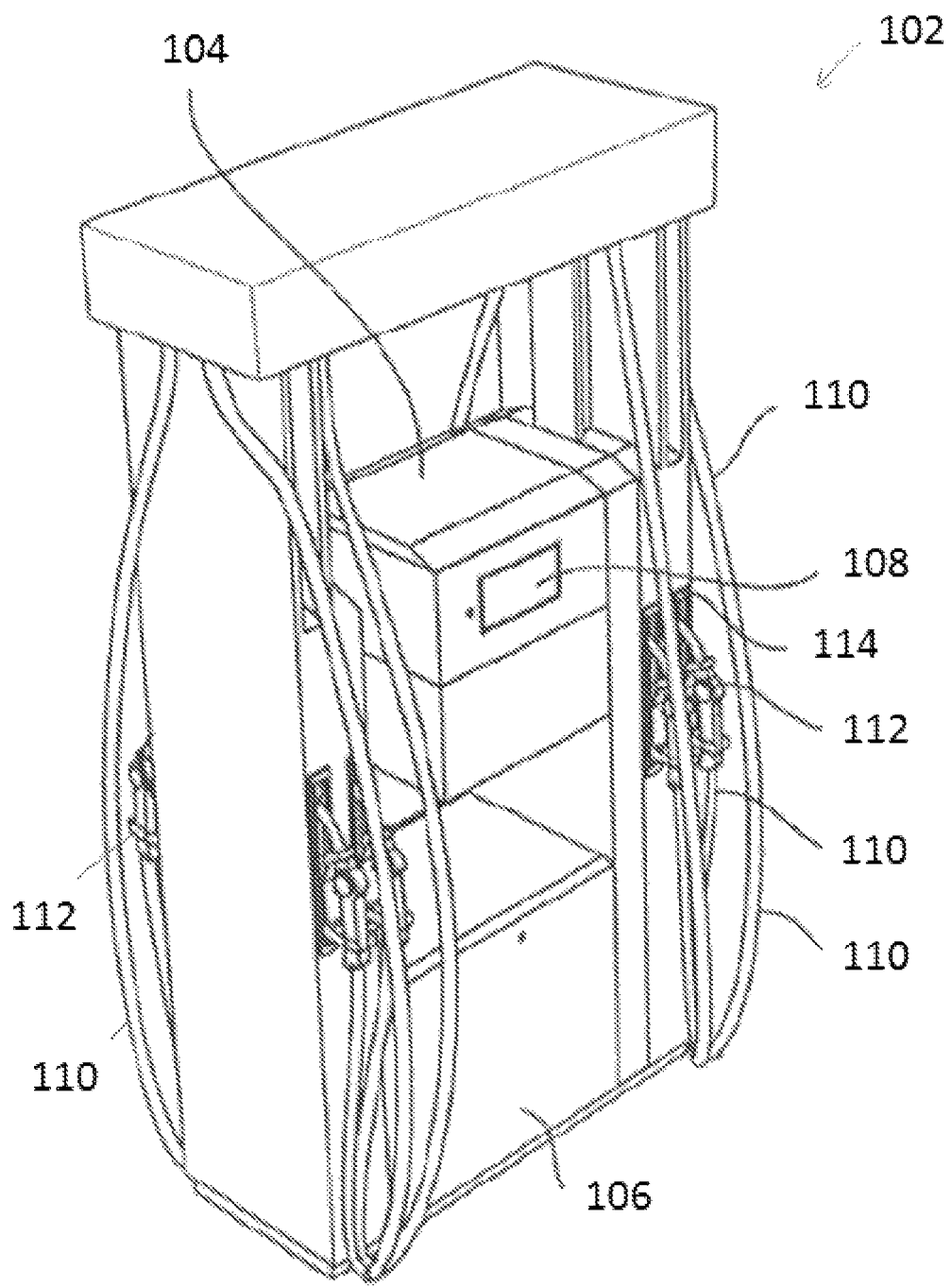
FIG. 1 is a diagram illustrating one implementation of a fuel dispenser in accordance with certain aspects of the present disclosure.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

As used herein, the terms "data signals" and "commands" can be used interchangeably to be not only commands that describe or directly cause a specific hardware or software operation, but can also include any type of data which may or may not be used to cause or initiate a hardware or software operation. Examples of commands that may directly cause an operation can be: initiate the dispensing of fuel, display a value on a visual display, terminate the dispensing of fuel, adjust a flow rate for a fuel pump, etc. Examples of commands that may not directly cause an operation can be: specify an amount of fuel to be pumped, query or receive an open/closed status of a pump or valve, a time or timestamp, etc. Thus the term "commands" can refer to any amount or type of data transmitted between the systems described herein.

To enable operation of a fuel dispenser, fueling and payment data signals can be transmitted between a forecourt controller and the fuel dispenser. However, when components of a fuel dispenser are replaced or upgraded, the components may require commands in a different format than those sent by the forecourt controller. In some cases, a fuel controller (which can control the mechanical operation of the fuel pump) can require commands in a different format than, for example, payment commands required by a payment terminal in a fuel dispenser. In such a case, a fuel controller translator can be utilized to translate the commands transmitted between the forecourt controller and the fuel dispenser. For example, where the forecourt controller transmits commands that are compatible with the payment terminal, but not with the fuel controller, the fuel controller translator can translate the commands received from the forecourt controller into a format compatible with the fuel controller. Conversely, the fuel controller translator can translate commands received from the fuel controller into a format that is compatible with the forecourt controller.

FIG. 1 is a diagram illustrating one embodiment of a fuel dispenser 102. The fuel dispenser 102 includes an electronics compartment 104 and a pump compartment 106. The electronics compartment 104 has therein electronics for facilitating payment for fuel and for facilitating the dispensing of the fuel. The electronics include, for example, a fuel controller configured to control dispensing of the fuel from the pump compartment, a communication unit configured to electronically communicate wired and/or wirelessly, a display 108 configured to show information (e.g., media content, payment information, etc.) thereon, a memory configured to store data therein, and a payment terminal (e.g., a card reader, etc.) configured to process customer payment. Only the display 108 is shown in FIG. 1. Similar components can be located on the other side of the electronics compartment 104. The fuel dispenser 102 can be configured for mobile payment instead of or in addition to payment through the payment terminal and hence need not include the payment terminal.

The pump compartment 106 has therein a pump configured to pump fuel from a fuel tank or other reservoir and has therein a fuel meter configured to monitor fuel flow. The pump compartment 106 can include other elements to facilitate fuel dispensing, such as valves, a vapor recovery system, etc. The pump compartment 106 is isolated from the electronics compartment 104 within the fuel dispenser 102 to facilitate safety, security, and/or maintenance, as will be appreciated by a person skilled in the art. Fuel is thus not allowed to flow from the pump compartment 106 to the electronics compartment 104 and instead flows from the pump compartment 106 through hoses 110 to nozzles 112 for dispensing. As will be appreciated by a person skilled in the art, the nozzles 112 are each configured to dispense fuel from the fuel dispenser 102 as pumped therefrom by the pump.

The fuel dispenser 102 is configured to be connected to the fuel tank or other reservoir containing fuel. When filling up the tank of a motor vehicle, the fuel is pumped from the tank or reservoir by the pump located in the pump compartment 106 and to a nozzle 112 via a fuel pipe (not shown) and a fuel hose 110. When each fuel hose 110 is not in use, the fuel hose 110 hangs along the fuel dispenser 102, and its associated nozzle 112 is seated in a nozzle boot 114. The illustrated fuel dispenser 102 includes four hoses 110 and four nozzles 112 on one side of the dispenser 102 and four hoses 110 and four nozzles 112 on the other side of the dispenser 102, but as will be appreciated by a person skilled in the art, the fuel dispenser 102 can include any number of hoses 110 and nozzles 112. A person skilled in the art will also appreciate that the fuel dispenser 102 can have various other configurations.

Figure 2:
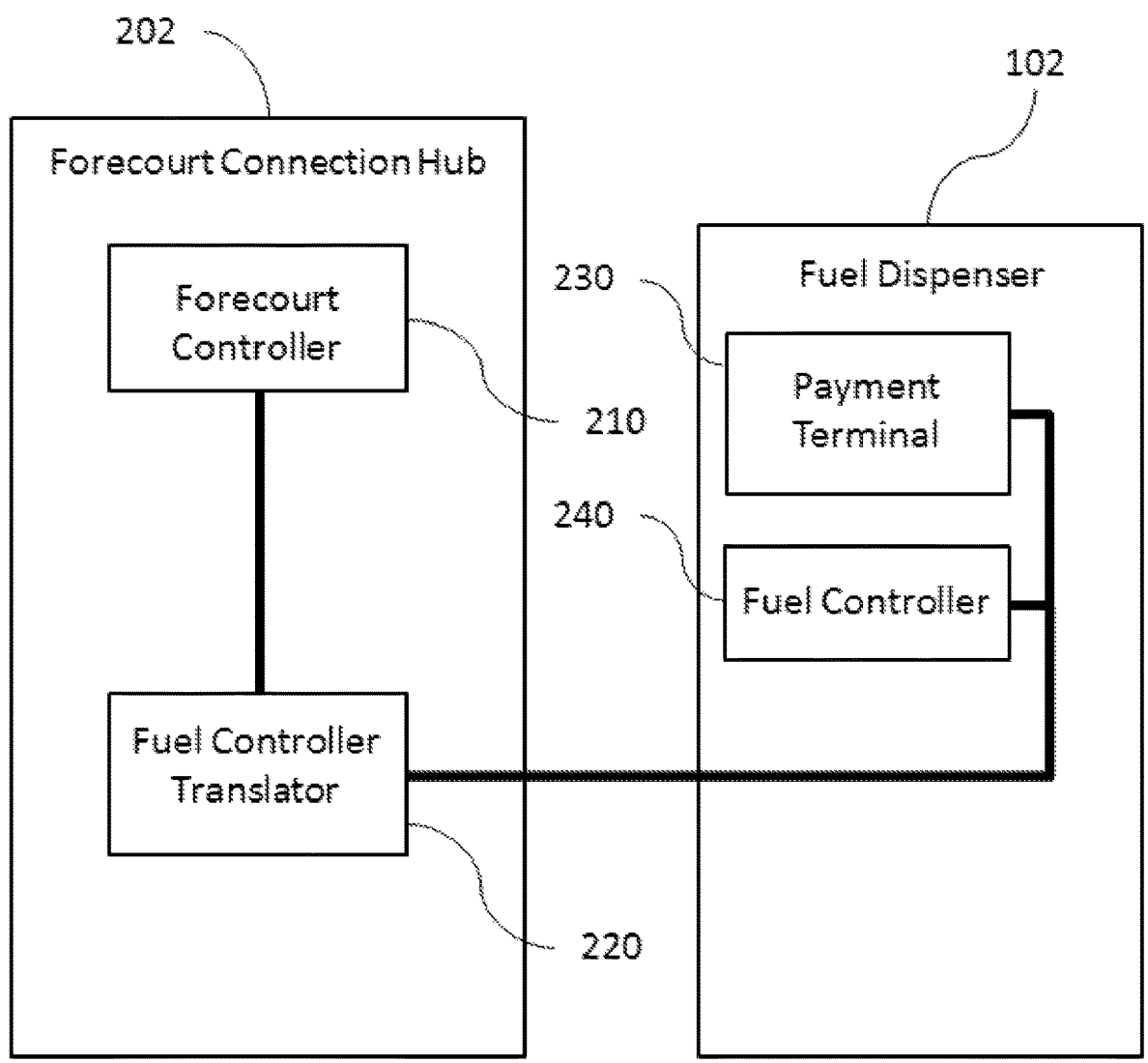
FIG. 2 is a diagram illustrating one implementation of a fuel controller translator in accordance with certain aspects of the present disclosure.

FIG. 2 is a diagram illustrating one implementation of a fuel controller translator 220 in accordance with certain aspects of the present disclosure. In some implementations, a fueling establishment can include a forecourt controller 210 located within a forecourt connection hub 202. The forecourt connection hub 202 can be an area located in or around a building, such as a store. The forecourt can include any area between the forecourt controller 210 and a fuel dispenser 102. For example, the forecourt can be where motorists bring their vehicles to be fueled, an intervening building area, or the like. The forecourt controller 210 can act to receive payment information, e.g., from a point-of-sale terminal, such as a cash register, as well as to monitor fuel dispensers, control fuel dispenser operation, or the like. The forecourt controller 210 can also send and receive commands to and from the fuel dispenser 102.

Any of the communication methods described herein can be wired or wireless, for example, Local-Area-Network (LAN), Wireless LAN (WLAN), Ethernet, Bluetooth, cellular, or the like. The communication can also be performed over an RS485 or US Current Loop connection. The forecourt controller 210 can be in communication with any number of fuel dispensers 102 to control the dispensing of fuel and the receiving of returned data or commands from the fuel dispensers 102.

In some cases, the format of commands used by the fuel controller 240 and the payment terminal 230 can be different. A fuel controller translator 220 can thus be provided for translating the data. For example, where a forecourt controller 210 and a payment terminal 230 use data having a first format, and a fuel controller 240 uses data having a different second format, the fuel controller translator 220 can translate the data sent to and received from the fuel controller 240. In particular, data in the second format received from the fuel controller 240 can be translated into the first format and sent to the forecourt controller 210, and data in the first format received from the forecourt controller 210 can be translated into the second format and sent to the fuel controller 240. Once a command has been received by the fuel controller 240, the fuel dispenser 102 can dispense the fuel as instructed by the forecourt controller 210.

While FIG. 2 illustrates the fuel controller translator 220 located within the forecourt connection hub 202, a person skilled in the art will appreciate that the fuel controller translator 220 can be located anywhere, including within the fuel dispenser 102, as long as it is configured to translate signals transmitted between the forecourt controller 210 and the fuel dispenser 102.

The translation of commands from the first format to the second format (or vice versa) can include translating and expanding a single element of data or command to multiple elements of data or commands (a 1 to N operation). In other implementations, the reverse can occur where the fuel controller translator 220 receives a number of commands or data inputs and translates and combines them to a single data element or command (an N to 1 operation). The translation can be performed by a central processing unit (CPU) that can be embedded in a translator board that is part of the fuel controller translator 220. In other implementations, the fuel controller translator 220 can be in a computer chip that can be installed in a circuit board.

When a command in the first format is received by the fuel controller translator 220, the fuel controller translator 220 can determine which format to translate the command into, and how many translated commands will be equivalent to the received command. There can be a conversion table, for example, a lookup table, database, or other conversion data that provides the basis for the translation. The conversion table can be stored in a memory of the fuel controller translator 220, on an external computing system, or the like. The conversion table can be read by the fuel controller translator 220 to determine the second format that corresponds to a type of fuel controller 240 that will receive the translated command. The second format can be vendor/model specific, and there can be entries in the conversion table that correspond to different vendor/models of the fuel controller 240 or payment terminal 230. The conversion table can then also be read to retrieve the appropriate command(s), in the second format compatible with the fuel controller 240, and transmit those translated commands to the fuel controller 240.

For N to 1 translation, the fuel controller translator 220 can include a buffer for an array to store incoming commands until the required number of commands is received for combination into the single command. For example, when the fuel controller translator 220 receives a partial command, the conversion table can identify this as a partial command. The fuel controller translator 220 can wait until other partial commands have been received which together can be combined into a single command. That single command can then be transmitted by the fuel controller translator 220.

In general, the fuel controller translator 220 can be configured to translate commands between two different formats for interpretation between any components of the fuel dispenser 102 and components in the forecourt or point-of-service location. For example, the "second format" can be the required format for the fuel controller 240, the payment terminal 230, or for some other component of the fuel dispenser 102, such as the fuel pump, a computer display, a shutoff valve, or the like. In some implementations, the fuel controller translator 220 can be in communication with more than one component, and there can be more than one type of second format. Accordingly, the fuel controller translator 220 can have translation software for each type of second format corresponding to the different types of fuel controllers 240, payment terminals 230, or other components. In some implementations, the fuel controller translator 220 software can be installed, for example, during the production process, when the fuel control translator 220 is installed on-site, as part of an update, or the like.

In some implementations, the command can be, for example, a hex code or strings, octets, binary code, analog electrical pulses, or the like that can be interpreted by the fuel controller 240 as a command. The fuel command translator can store commands according to vendor, model, or the like. In some implementations, the fuel control translator can have a single, or otherwise limited number of formats that it can translate. Accordingly, there can be multiple fuel controller translators 220 that can be concurrently installed to handle additional types of translation.

The translation can be bi-directional to handle, for example a response from the fuel controller 240. For example, the fuel controller translator 220 can translate any data received from the fuel controller 240 (in the second format) to the first format. This translated data can then be transmitted to the forecourt controller 210.

Also, while some examples herein describe translating fuel controller 240 commands, other types of commands, either instead of or in addition to the fuel controller 240 commands, can be translated. For example, the fuel controller translator 220 can be configured to translate payment terminal 230 commands, or commands between any component of the fuel dispenser 102 and the forecourt connection hub 210. As such, the adjective "fuel controller" should not necessarily be considered a limiting feature to exclude other uses of the fuel controller translator 220 or other types of translators installed for the purposes described herein.

Also, the fuel controller translator 220 can receive commands that do not require translation. For example, the forecourt controller 210 can be configured to transmit/receive commands in a first format. The payment terminal 230 can be configured to transmit/receive commands also in the first format. The fuel controller 240, on the other hand, can be configured to transmit/receive commands in the second format. Such a configuration can be referred to as a "hybrid" fuel dispenser. This can occur with the electronics compartment, or portions thereof, are upgraded or replaced using components provided by a different vender than the remainder of the fuel dispenser. Here, when the fuel controller translator 220 receives commands for the payment terminal 230 in the first format, no translation may be needed. The fuel controller translator 220 can then transmit the original commands (in the first format) to the payment terminal 230.

In some implementations, the commands can include an identifier indicating what format they are in. The identifier can be read by the fuel controller translator 220 to determine if translation is needed.

When a fueling establishment includes multiple fuel dispensers 102, multiple fuel controller translators can be installed in one or more housings. The housings can be located, for example, in the forecourt connection hub, in the forecourt, in a building or other structure, on the fueling dispensers, or at an off-site location.

Figure 3:
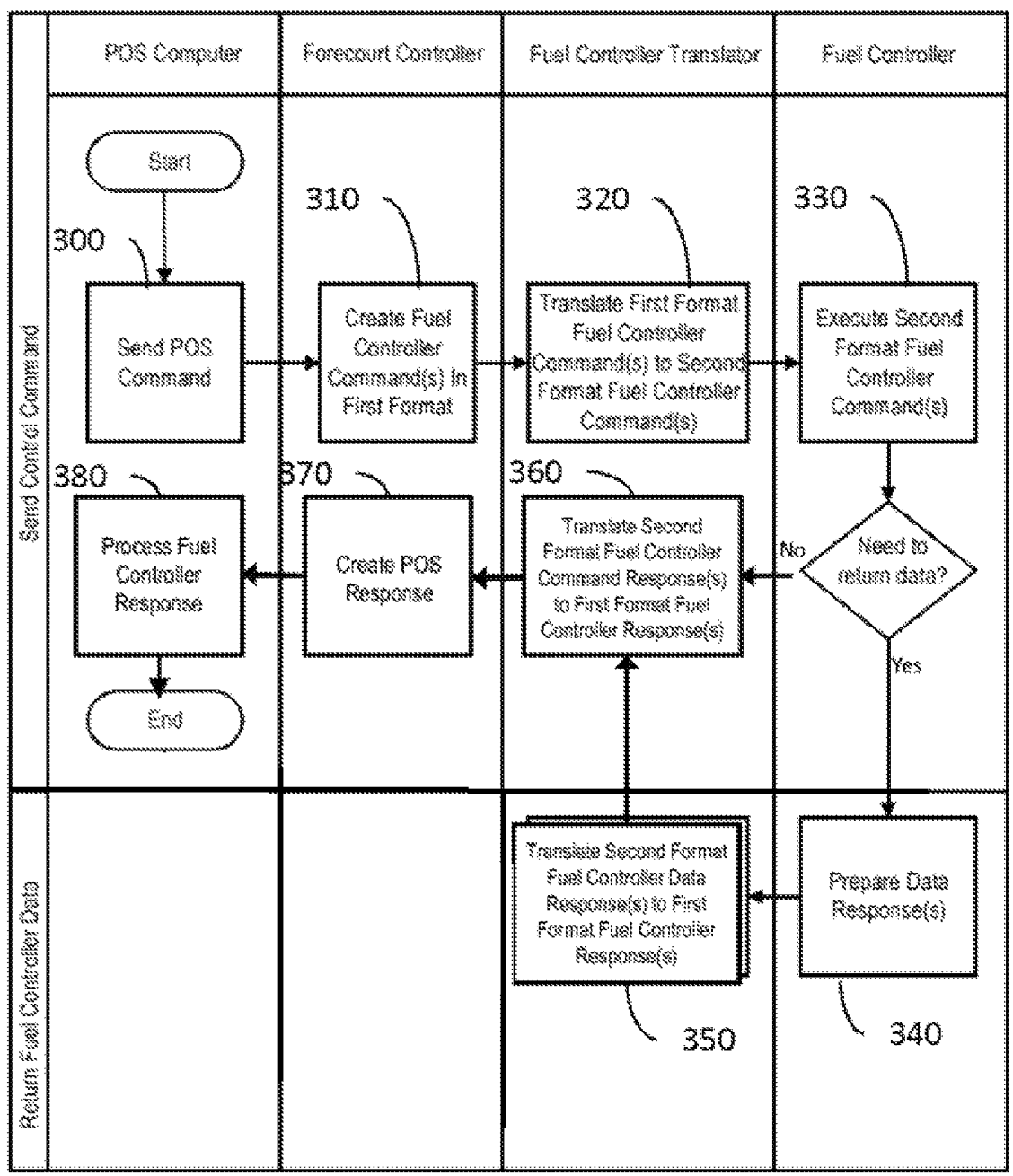
FIG. 3 is a process flow diagram illustrating a method in accordance with certain aspects of the present disclosure.

FIG. 3 is a process flow diagram illustrating a method in accordance with certain aspects of the present disclosure.

At 300, the POS computer, or other system at the POS, can send a POS command to the forecourt controller.

At 310, the forecourt controller 210 can generate, in the first format, data or commands based on the commands received from the POS computer. The generated commands can be transmitted to the fuel controller translator 220.

At 320, the fuel controller translator 220 can translate the received commands, or a portion thereof, in the first format to commands in a second format. The translated commands can then be transmitted by the fuel controller translator 220 to the fuel controller 240.

At 330, the fuel controller 240 can execute the received commands to operate the fuel dispenser 102.

The fuel controller 240 can generate responses (herein also referred to as second commands to distinguish from first commands received by the fuel controller 240) based on the commands executed at 330. The responses can be, for example, a fuel controller command response and/or a fuel controller data response. The fuel controller command response can be a command response from a component of the fuel dispenser 102 that reflects a status of the component or result of the executed command.

At 340, when there is a need to return a fuel controller data response, the fuel controller data response can be generated for transmission to the fuel controller translator 220. A fuel controller data response can be any data that is not a direct result of the execution of fuel controller commands.

The second commands can be in the second format. Generation of the second command can be in response to the received command (a fuel controller command response) or can be independent of the received commands or fuel dispenser operation (a fuel controller data response). The second command can then be transmitted by the fuel controller 240 to the fuel controller translator 220.

At 350, the fuel controller translator 220 can translate the second format fuel controller data response, or a portion thereof, from the second format to the first format.

At 360, the fuel controller translator 220 can translate the second format fuel controller command response, or a portion thereof, from the second format to the first format. The fuel controller translator 220 can transmit the translated second command (in the first format) to the forecourt controller 210. Similarly, the translated fuel controller data responses (if any) can be transmitted to the forecourt controller 210.

At 370, the forecourt controller 210 can generate commands or responses for the POS computer based on the translated second command received from the fuel controller translator 220.

At 380, the POS computer can process the fuel controller response. The processing can include, for example, displaying a current status of the fuel controller 240 or payment terminal 230, displaying how much fuel has been pumped, or the like.

Figure 4:
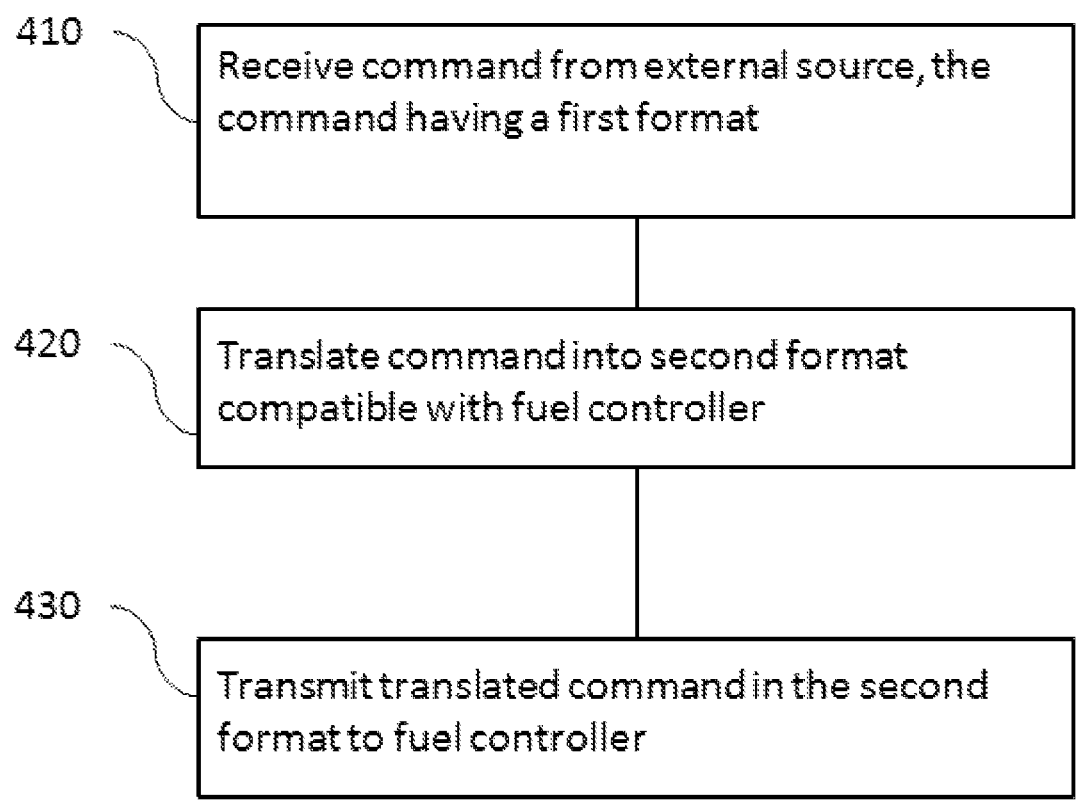
FIG. 4 is a process flow diagram illustrating another method in accordance with certain aspects of the present disclosure.

FIG. 4 is a process flow diagram illustrating another method in accordance with certain aspects of the present disclosure.

At 410, a command can be received from an external source, the command having a first format.

At 420, the command can be translated into a second format compatible with a fuel controller 240.

At 430, the translated command can be transmitted in the second format to a fuel controller 240.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A fuel dispenser, comprising:
a housing comprising:
  a pump compartment with fuel dispensing components disposed therein and a fuel controller disposed within the pump compartment and configured to control dispensing of fuel by the fuel dispensing components;
  an electronics compartment including a payment terminal configured to process payment for fuel dispensed by the fuel dispensing components;
  a translator board having at least one programmable processor, the translator board connected by a first wire to an external source and connected by a second wire to the fuel controller; and
a non-transient machine-readable medium storing instructions which, when executed by the at least one programmable processor, configure the fuel dispenser to perform operations comprising:
  receiving a command from an external source, the command having a first format;
  reading a conversion table stored in a memory, the conversion table including a plurality of entries, each of the entries corresponding to a different type of fuel controller;
  selecting a one of the plurality of entries that corresponds to a type of the fuel controller that is connected by the second wire to the translator board;
  determining, based on the selected one of the plurality of entries, a second format for the command; and
  transmitting the command in the second format to the fuel controller.

2. The fuel dispenser of claim 1, wherein the instructions, when executed by the at least one programmable processor, also configure the fuel dispenser to perform operations comprising:
  receiving a second command in the second format from the fuel controller;
  translating the second command into the first format compatible with the external device; and
  transmitting the translated second command in the first format to the external device.

3. The fuel dispenser of claim 1, wherein the instructions, when executed by the at least one programmable processor, also configure the fuel dispenser to perform operations comprising:
  combining a plurality of commands in the first format into a single command in the second format, the translated command comprising the single command.

4. The fuel dispenser of claim 1, wherein the instructions, when executed by the at least one programmable processor, also configure the fuel dispenser to perform operations comprising:
  expanding a command in the first format into a plurality of commands in the second format, the transmitted command comprising the plurality of commands.

5. The fuel dispenser of claim 1, wherein the external source is a point-of-sale system configured to control operation of a component of the fuel dispenser.

6. The fuel dispenser of claim 1, wherein the different types of fuel controllers are different based on the fuel controllers each being a different model of fuel controller; and the selected one of the plurality of entries corresponds to a model of the fuel controller that is connected by the second wire to the translator board.

* * * * *